United States Patent [19]

Crawford et al.

[11] Patent Number: 4,922,165
[45] Date of Patent: May 1, 1990

[54] CORE AND SLOT LINER

[75] Inventors: Delmar E. Crawford, Holland, Mich.; Harold T. Fields, Ft. Wayne, Ind.

[73] Assignee: General Electric Company, Fort Wayne, Ind.

[21] Appl. No.: 296,630

[22] Filed: Jan. 13, 1989

Related U.S. Application Data

[62] Division of Ser. No. 173,929, Jun. 6, 1988.

[51] Int. Cl.⁵ ............................................. H02K 23/60
[52] U.S. Cl. ...................................... 310/215; 310/45; 310/216
[58] Field of Search ................. 310/45, 174, 180, 208, 310/215, 216, 254

[56] References Cited

U.S. PATENT DOCUMENTS

| | | | |
|---|---|---|---|
| 2,495,010 | 1/1950 | Kirkpatrick | 310/215 |
| 3,127,470 | 3/1964 | Andersson et al. | 427/116 |
| 3,802,066 | 4/1974 | Barrett | 310/216 |
| 4,485,126 | 11/1984 | Gaietto et al. | 427/116 |
| 4,559,698 | 12/1985 | Bair et al. | 29/598 |
| 4,747,288 | 5/1988 | Fritzsche | 310/216 |
| 4,788,761 | 12/1988 | Crawford et al. | 310/215 |

FOREIGN PATENT DOCUMENTS 2826260 1/1979 Fed. Rep. of Germany .

Primary Examiner—Patrick R. Salce
Assistant Examiner—Anita M. Ault
Attorney, Agent, or Firm—Ralph E. Krisher, Jr.

[57] ABSTRACT

A core for a dynamoelectric machine has a pair of generally opposite end faces, and wall means is provided in the core for defining at least one winding receiving slot intersecting the opposite end faces, respectively. At least a pair of layers of generally thin dielectric material are associated in overlaying relation and disposed in the slot. A set of apertures are arranged in a preselected pattern in the layers and disposed in non-aligning relation, and a set of non-apertured sections in the layers are arranged in the layer between the apertures, respectively. At least some of the apertures in each layer are communicated with at least some of the non-aperture sections in an adjacent layer, and the at least some apertures in one of the layers is also communicated with the wall means of the at least one slot.

A method of assembling a core, a method of treating a core, and a method of assembling a slot liner are also disclosed.

28 Claims, 7 Drawing Sheets

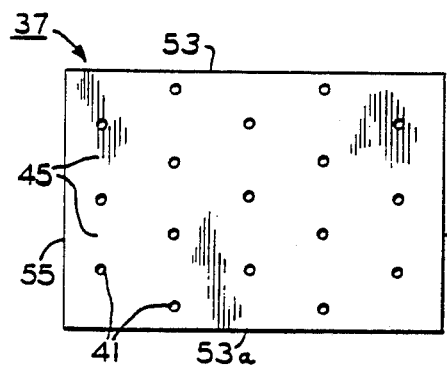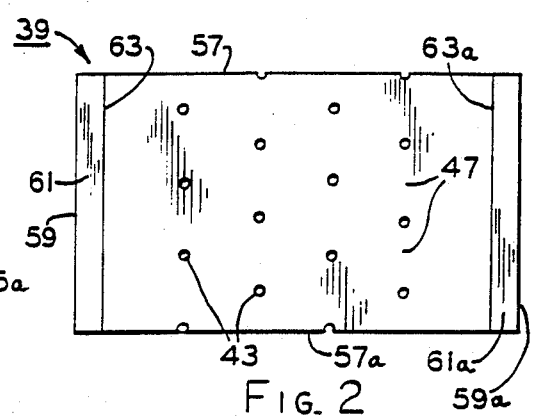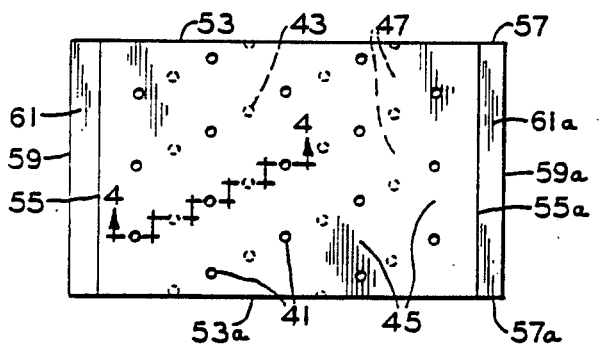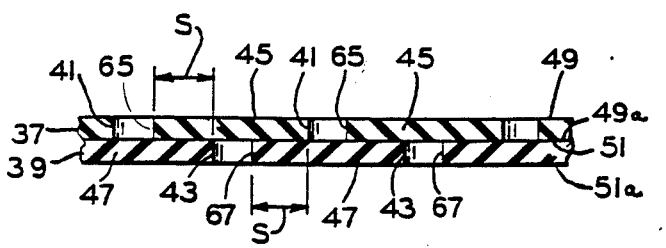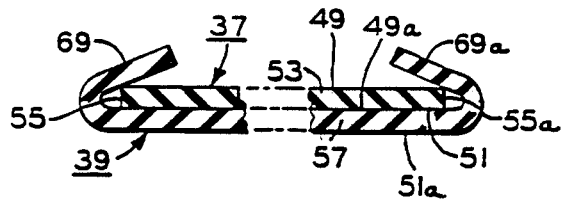

CORE AND SLOT LINER

CROSS-REFERENCE TO RELATED PATENTS

This application is a division of the now copending commonly assigned parent application Ser. No. 173,929 filed June 6, 1988 which is a division of grandparent application Ser. No. 66,840 filed June 26, 1987 and; is related to U.S. Pat. No. 4,485,126 issued Nov. 27, 1984 to Joseph R. Gaietto et al. and U.S. Pat. No. 4,559,698 issued Dec. 24, 1985 to Eugene C. Bair et al., and each of these parent and grandparent applications and related patents is incorporated herein by reference.

FIELD OF THE INVENTION

This invention relates in general to electrical apparatus and in particular to a core for a dynamoelectric machine and a slot liner.

BACKGROUND OF THE INVENTION

In the past various different methods were employed to treat a core of a dynamoelectric machine with a hardenable liquid adhesive material in order to bond together the interfacing lamination surfaces of the core. A typical past core had a lamination stack, and the laminations may have been retained in interfacing relation in the stack by suitable means, such as welding, bonding or cleating or the like for instance. Winding means associated with the stator included a plurality of coils having opposite side turn portions received in slots provided therefor in the core, and the coils also had opposite end turn portions arranged in generally annular groupings thereof adjacent the opposite end faces of the core. Of course, suitable insulation, such as for instance a slot liner of dielectric material, was provided in the core slots to electrically insulate the opposite side turn portions of the coils from the core, and suitable winding retaining means, such as slot wedges or the like for instance, were positioned in the slots of the core to maintain the opposite side turn portions of the coils against displacement from the slots into the bore of the core.

In one of the aforementioned past treatment methods for the core when the laminations were retained by welding or cleating, the core and its winding means were baked or preheated to a preselected temperature, and while at such an elevated temperature, the core and its winding means were immersed or dipped into a bath of the liquid adhesive material. When the core was so immersed, it is believed that the liquid adhesive material entered into the core for the most part from the outer circumferential portion of the core and penetrated by capillary action between the interfacing lamination surfaces of the core. When later removed from the liquid adhesive material bath, the core and its winding means were rebaked or reheated to effect the hardening or curing of the liquid adhesive material which had adhered to the core. In some instances, the core and its winding means may have been reimmersed in the liquid adhesive material bath and rebaked. While the above discussed past treatment method may have bonded together the laminations of the core to provide adequate core strength, one of the disadvantageous or undesirable features of such past treatment method is believed to be that it may have been necessary to wipe excess liquid adhesive material from the opposite end faces and the circumferential surface of the core prior to baking the core to cure the liquid adhesive material.

Still another past method of treating a loose wound core involved a bolt-down bonding process as shown in U.S. Pat. No. 3,821,846 issued July 2, 1974 to Bernard J. Pleiss, Jr. In this past method, a plurality of bolts were extended through bolt holes provided in the loose lamination stack of the loose wound core so as to mount an opposite end face of the loose wound core against a bolt down fixture. Upon torquing of the bolts, the interfacing lamination surfaces in the loose lamination stack were forced or clamped together by the bolts generally in the vicinity of the bolt holes thereby to establish generally axial compression regions generally adjacent the bolt holes between the opposite end faces of the loose wound core. When so mounted to the bolt-down fixture, the loose wound core was preheated and immersed into a liquid adhesive material bath with the exception of the annular end turn grouping of the windings adjacent the winding lead ends. Since the bore of the loose wound core was mounted on an alignment mandrel, it is believed for the most part that the liquid adhesive material may have penetrated by capillary action from the outer circumferential surface of the loose wound core between the interfacing lamination surfaces thereof except for the axial compression regions established adjacent the bolt holes. Albeit not discussed or even suggested in the Pleiss, Jr. patent, it is believed that the possibility may have existed wherein some of the liquid adhesive material may have been transferred in some manner from the slots of the loose wound core by capillary action between the interfacing lamination surfaces of the loose wound core. Thereafter, the loose wound core was baked to effect the curing of the liquid adhesive material in the loose wound core thereby to bond it together. Nevertheless, it is believed that this past treatment method for loose wound cores has at least generally the same disadvantageous or undesirable features of the previously discussed past treatment method.

As disclosed in U.S. Pat. No. 4,559,698 issued Dec. 24, 1985 to Eugene C. Bair et al., liquid adhesive material was applied or metered onto annular end turn groupings of winding means of a core, and in response to a preselected rotation sequence of the core, the liquid adhesive material was flowed from the end turn groupings along opposite side turn portions of the winding means into slots of the core within insulating slot liners and slot wedges in the core slots. Since the slot liners and slot wedges in part overlaid each other within the core slots, the liquid adhesive material was flowed between the overlaying parts of the slot liners and slot wedges into communication with interfacing lamination surfaces in the core intersecting with the core slots. By capillary action, the liquid adhesive material penetrated into the core between the interfacing lamination surfaces, and in response to subsequent baking of the core, the liquid adhesive material was cured thereby to bond the core and its winding means into a unitary mass. While this past treatment method undoubtedly exhibited many salient features, it is believed that when the necessary amount of liquid adhesive material was applied to insure proper distribution of the liquid adhesive material between the interfacing lamination surfaces to effect adequate core bond strength, some of the liquid adhesive material may have flowed from some of the core slots onto the opposite end faces of the core. Of course, prior to baking of the core, it was necessary to wipe away any liquid adhesive material which may have accumulated on the opposite end faces of the core, and as previously mentioned, it is believed that the additional operation of removing the liquid adhesive material from the opposite end faces of the core may have been a disadvantageous or undesirable feature of this past treatment method.

In West German Patent No. 2,826,260, liquid adhesive material was flowed through a plurality of apertures in a slot liner in each core slot so as to adhere the slot liner in the slot. The West German Patent alleges that the adherence of the slot liners in the slots obviates displacement of the slot liners and windings contained therein in response to vibration which may occur when the windings are energized and also that such apertures facilitate cooling of the windings. However, one of the disadvantageous or undesirable features of this past treatment method is believed to be that the voltage creepage distance through the apertures in the slot liners between the windings within the slot liners and the core slots would not meet requirements of at least some national regulatory agencies, such as for instance NEMA or Underwriters Laboratories, Inc. in the U.S.A. and Canadian Standards Association in Canada.

SUMMARY OF THE INVENTION

Among the several objects of the present invention may be noted the provision of an improved core for a dynamoelectric machine and an improved slot liner for a winding receiving slot in a core of a dynamoelectric machine which overcome the above discussed disadvantageous or undesirable features, as well as others, of the prior art; the provision of such improved core and slot liner in which at least a pair of layers of dielectric material are arranged at least in part in overlaying relation with a plurality of apertures in each layer being predeterminately misaligned with the apertures in an adjacent layer so that at least some of the apertures in each layer communicate with respective non-apertured sections of the adjacent layer; the provision of such improved core and slot liner wherein a marginal wall of each aperture in each layer is predeterminately spaced from the marginal walls of adjacent apertures in the adjacent layer; the provision of such improved core in which one of the layers of the slot liner is disposed at least adjacent wall means in the core defining at least one winding receiving slot between a pair of opposite end faces of the core and another of the layers of the slot liner is disposed at least adjacent a part of the winding means for the core received in the at least one slot in the core; the provision of such improved core and slot liner in which the one layer of the slot liner is located between a pair of opposite cuffs on the another layer of the slot liner so that when the slot liner is assembled with the core, the cuffs are disposed at least adjacent the opposite end faces of the core generally at the intersections of the at least one slot with the opposite end faces of the core; the provision of such improved core and slot liner in which the components utilized therein are simplistic in design, easily assembled and economically manufactured. These as well as other objects and advantageous features of the present invention will be in part apparent and in part pointed out hereinafter.

In general and in one form of the invention, a core for a dynamoelectric machine has a pair of generally opposite end faces, and wall means in the core for defining at least one winding receiving slot intersects with the opposite end faces, respectively. At least a pair of layers of generally thin dielectric material are associated at least in part in overlaying relation and disposed at least in part with the at least one slot. The layers include a set of apertures arranged in a preselected pattern and disposed in non-aligning relation and also a set of non-apertured sections between the apertures. At least some of the apertures in each layer are communicated with at least some of the non-apertured sections in an adjacent layer, and the at least some apertures in one of the layers are also communicated with the wall means, respectively.

Further in general, a slot liner in one form of the invention is provided for use in a winding receiving slot in a core for a dynamoelectric machine. The slot liner has a plurality of layers of generally thin dielectric material associated at least in part in overlaying relation. Each layer includes a plurality of apertures extending therethrough and arranged in a preselected pattern. The apertures in adjacent layers are disposed in non-aligning relation, and at least some of the apertures in each layer communicate with a non-apertured section in another of the layers, respectively.

Also in general, a method is provided in one form of the invention for assembling a slot liner for a dynaomelectric machine. The slot liner includes at least a pair of sheets of generally thin dielectric material with each sheet having a plurality of apertures extending therethrough in a preselected pattern and a plurality of non-apertured sections between the apertures, respectively. In practicing this method, the sheets are associated at least in part in overlaying relation. The apertures in adjacent sheets are disposed in non-aligning relation with each other, and at least some of the apertures in each sheet are communicated with at least some of the non-apertured sections in the adjacent sheets, respectively, when the sheets are asociated in their overlaying relation.

BRIEF DESCRIPTION OF THE DRAWINGS

FIG. 1 is a plan view showing a sheet of generally thin dielectric material having a plurality of apertures extending through the sheet in a preselected pattern;

FIG. 2 is a plan view showing another sheet of generally thin dielectric material having another plurality of apertures extending through the another sheet in another preselected pattern;

FIG. 3 is a plan view illustrating in part a slot liner in one form of the invention and showing the sheets of FIGS. 1 and 2 arranged in overlaying relation with the apertures in the sheet of FIG. 2 being shown as circular dotted lines and illustrating principles which may be practiced in a method of assembling a slot liner for a dynamoelectric machine;

FIG. 4 is an enlarged partial sectional view taken along line 4—4 in FIG. 3;

FIG. 5 is an enlarged interrupted left end elevational view of the overlaid sheets in FIG. 3 showing a pair of opposite imperforate strips on one of the sheets formed into a pair of opposite cuffs;

Corresponding reference characters indicate corresponding parts throughout the several views of the drawings.

The exemplifications set out herein illustrate the preferred embodiments of the invention in one form thereof, and such exemplifications are not to be construed as limiting in any manner either the scope of the invention or the scope of the disclosure thereof.

DETAILED DESCRIPTION OF THE PREFERRED EMBODIMENTS

Figure 6:
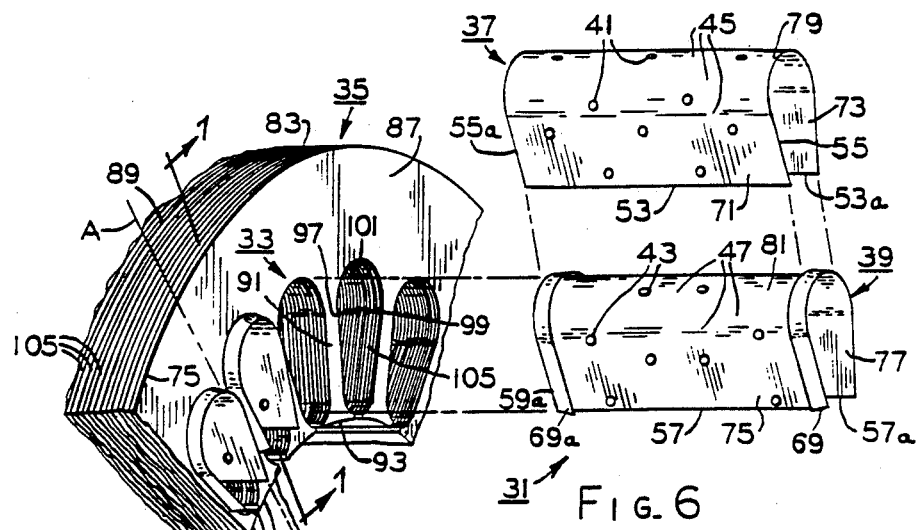
FIG. 6 is a partial perspective exploded view of a core in one form of the invention and illustrating principles which may be utilized in a method of assembling the core.

With reference now to the drawings in general, there is illustrated a method of assembling a slot liner or slot liner assembly 31 for use in a winding receiving slot 33 in a core or stator 35 of a dynamoelectric machine (not shown) (FIG. 6). Slot liner 31 includes at least a pair of sheets or layers 37,39 of generally thin dielectric material, and the sheets have a plurality of apertures or openings 41,43 extending therethrough in a preselected pattern, respectively (FIGS. 1 and 2). Sheets 37,39 also have a plurality of non-apertured sections or portions 45,47 interconnecting between apertures 41,43, respectively (FIGS. 1 and 2). In the practice of this method, sheets 37,39 are associated at least in part in overlaying relation (FIG. 3). Apertures 41,43 in adjacent sheets 37,39 are disposed or associated in non-aligning relation with each other, and at least some of the apertures in each sheet are communicated with at least some of the non-apertured sections 45,47 in the adjacent sheets, respectively, when the sheets are associated in their overlaying relation (FIGS. 3 and 4).

More particularly and with specific reference to FIGS. 1-4, the dielectric material of sheets 37,39 may be a Mylar sheet material available from E. I. duPont de Nemours and Company, Wilmington, Del.; however, it is contemplated that the sheets may be formed of various different types of dielectric material within the scope of the invention so as to meet at least some of the objects thereof. Sheets 37,39 each include a pair of generally opposite surfaces 49,49a and 51,51a. Opposite surfaces 49,49a of sheet 37 are interconnected by a pair of sets of generally opposite marginal edges 53,53a and 55,55a, and adjacent ones of the opposite marginal edges intersect with each other. Opposite surfaces 51,51a of sheet 39 are interconnected by another pair of sets of generally opposite marginal edges 57,57a and 59,59a, and adjacent ones of the opposite marginal edges 57,57a and 59,59a intersect with each other. As further discussed hereinafter, sheet 39 is provided with a pair of generally opposite imperforate parts or strips 61,61a extending along opposite marginal edges 59,59a and between opposite surfaces 51,51a of the sheet, and if desired, such imperforate strips may be delineated by fold lines 63,63a impressed in the sheet in spaced apart relation from opposite marginal edges 59,59a. While sheets 37,39 are illustrated herein as having a particular configuration for purposes of disclosure, it is contemplated that other sheets having different configurations may be utilized within the scope of the invention so as to meet at least some of the objects thereof.

Apertures 41,43 in sheets 37,39 have wall means, such as marginal walls or sidewalls 65,67 or the like for instance, defining the particular configurations of the apertures, as best seen in FIG. 4, and a pair of opposite ends or end portions of wall means 65 intersect with opposite surfaces 49,49a of sheet 37 while another pair of opposite ends or end portions of wall means 67 intersect with opposite surfaces 51,51a of sheet 39, respectively. Although the particular configurations of apertures 41,43 are illustrated herein for purposes of disclosure, it is contemplated that other apertures having various different configurations, such as generally rectangular openings or slits or the like for instance, may be utilized in the sheets within the scope of the invention so as to meet at least some of the objects thereof. Furthermore, while apertures 41,43 are shown spaced or arranged in sheets 37,39 in the aforementioned preselected patterns, as illustrated in FIGS. 1 and 2 for purposes of disclosure, it is contemplated that the apertures may be arranged in various different patterns in the sheets within the scope of the invention so as to meet at least some of the objects thereof.

When sheets 37,39 are associated in their overlaying relation, as previously mentioned and as best seen in FIGS. 3-5, opposite surface 49a of sheet 37 is engaged with opposite surface 51 of sheet 39, and opposite marginal edges 55,55a of sheet 37 are aligned generally along opposite imperforate strips 61,61a of sheet 39 in spaced apart relation with opposite marginal edges 59,59a of sheet 39 while the other opposite marginal edges 53,53a and 57,57a on sheets 37,39 are located at least generally adjacent each other, respectively. Thus, since apertures 41,43 are arranged in preselected patterns in sheets 37,39, as previously mentioned, it may be noted that wall means 65,67 of apertures 41,43 in sheets 37,39 are disposed in non-aligning or staggered relation with each other when the sheets are associated in their aforementioned overlaying relation, respectively. Furthermore, it may also be noted that non-apertured sections 45,47 in sheets 37,39 are engaged generally about the intersections of the opposite ends of aperture wall means 65,67 with opposite surfaces 49a,51 on sheets 37,39 when the sheets are associated in their aforementioned overlaying relation, respectively.

While apertures 41,43 communicate with non-apertured sections 45,47 in adjacent sheets 37,39 when the sheets are associated in their aforementioned overlaying relation, it may be noted that a preselected space or distance S of at least generally about three thirty-seconds of an inch or 0.094 inches (2.39 mm) is established or provided for voltage creepage purposes, as discussed in greater detail hereinafter, between wall means 65 of each aperture 41 in sheet 37 and the wall means 67 of apertures 43 in sheet 39 which are spaced adjacent respective ones of such each aperture 41 in sheet 37. Likewise, the same space S is also established between wall means 67 of each aperture 43 in sheet 39 and the wall means 65 of apertures 41 in sheet 37 which are spaced adjacent respective ones of such each aperture 43 in sheet 39.

Upon the establishment of the preselected space S between apertures 41,43 in adjacent sheets 37,39 in the manner discussed above, opposite imperforate strips 61,61a of sheet 39 may be deformed or folded over generally along fold lines 63,63a so as to form a pair of generally opposite cuffs 69,69a which extend generally angularly with respect to sheet 39, as best seen in FIG. 5. Upon the formation of opposite cuffs 69,69a on sheet 39, it may be noted that the opposite cuffs are positioned at least in part in spaced overlaying relation with sheet 37 adjacent its opposite marginal edges 55,55a, respectively. It may be noted that upon the formation of opposite cuffs 69,69a on sheet 39, the cuffs engage sheet 37 along its opposite marginal edges 55,55a serving to retain or capture sheet 37 in its aforementioned overlaying relation with sheet 39 thereby to maintain the preselected space S between apertures 41,43 in the adjacent sheets, respectively. Even if sheets 37,39 shift relative to each other generally lengthwise or along opposite cuffs 69,69a on sheet 39, it may be noted that the preselected pattern in which apertures 41,43 are arranged obviate the possibility of wall means 65,67 of the apertures being spaced apart from each other a distance less than the preselected space S.

When cuffs 69,69a are formed on sheet 39, as discussed above, sheets 37,39 in their overlaying relation may be deformed or shaped into a preselected configuration at least generally approximating the configuration of slot 33 in core 35, as shown in FIG. 6. When so shaped, sheets 37,39 are deformed into a generally U-shaped or horseshoe shaped configuration, and aligned adjacent opposite marginal edges 53,57 and 53a,57a of the sheets are arranged or positioned generally in laterally spaced apart relation with respect to each other. With the deformed sheets 37,39 in their generally U-shaped configuration, it may be noted that the sheets are provided with opposite sides or side portions 71,73 and 75,77, and generally arcuate ends or end portions 79,81 on the sheets are integrally interconnected between the opposite side portions, respectively. Of course, opposite side portions 75,77 and end portion 81 on sheet 39 extend between opposite cuffs 69,69a on sheet 39, and opposite side portions 71,73 and end portion 79 on sheet 37 are arranged in overlaying relation with opposite side portions 75,77 and end portion 81 between the opposite cuffs on sheet 39, respectively. Albeit not shown for the purpose of drawing simplification and brevity of disclosure, it is contemplated that the above discussed assembling and shaping of slot liner 31 may be accomplished by suitable apparatus, and it is also contemplated that such apparatus may also be employed to effect the placement or injection of the slot liners in core slots 33 therefor in the manner discussed in detail hereinafter. If a more detailed discussion is desired concerning the construction and operation of typical apparatus which is representative of the type mentioned above, reference may be had to U.S. Pat. No. 3,514,836 issued June 2, 1970 to L. M. Mason. To complete the description relating to slot liner 31 and the method of assembling it, it is contemplated that the preselected pattern of apertures 41,43 in sheets 37,39 may provide a greater number of such apertures in overlaying end portions 79,81 of the slot liner than in either of the overlaying opposite side portions 71,73 and 75,77 of the slot liner, or vice versa.

Figure 7:
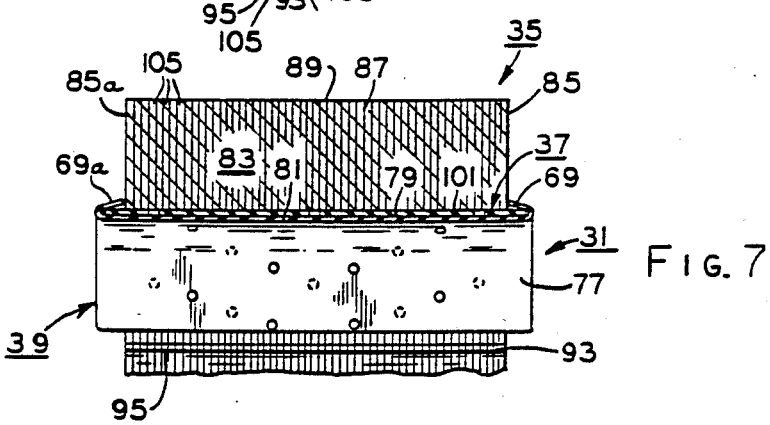
FIG. 7 is a sectional view taken along line 7—7 in FIG. 6.

With reference to FIGS. 6 and 7, core 35 in one form of the invention has a lamination stack 83 with a pair of generally opposite end faces 85,85a, and the laminae in the stack is formed of generally thin ferromagnetic material. A yoke or yoke section 87 extends generally axially between opposite end faces 85,85a of stack 83 so as to define a circumferential surface 89 about the stack, and a plurality of teeth 91 extend generally radially inwardly on preselected pitch axes A from the yoke section and generally in axial row formations between the opposite end faces, respectively. Each tooth 91 in stack 83 has a tip end 93 defining in part a bore 95 which extends generally axially through stack 83 between opposite end faces 85,85a. A plurality of wall means in stack 83 defines slots 33 with each slot including a pair of opposed sidewalls 97,99 on adjacent ones of teeth 91 and a generally arcuate end wall 101 on yoke 87 interconnecting between the opposed sidewalls, respectively. Opposed sidewalls 97,99 and end wall 101 of each slot 33 extend generally axially through stack 83 intersecting with opposite end faces 85,85a, and a plurality of openings or slot entrances 103 are provided between adjacent ones of tooth tips 93 interconnecting the slots and bore 95 with the openings and extending generally axially between the opposite end faces so as to intersect therewith, respectively. While slots 33 are shown herein as round-bottom slots, it is contenplated that other slots having various other configurations, such as for instance a flat-bottom slot or the like, may be utilized within the scope of the invention so as to meet at least some of the objects thereof. To complete the description of stack 83, a plurality of interfacing lamination surfaces 105 in the stack intersect with circumferential surface 89, opposed sidewalls 97,99 and end walls 101 of each slot 33, and tooth tips 93, respectively. While stack 83 is illustrated herein for purposes of disclosure as having a generally annular configuration, it is contemplated that various other stacks having different configurations, such as a stack with at least one flat on its circumferential surface or a stack defining an inside-out core of a type known to the art for instance, may be utilized within the scope of the invention so as to meet at least some of the objects thereof. Furthermore, it is also contemplated that stack 83 may be formed of a plurality of individual laminations arranged in face-to-face relation or may be helically wound from a continuous lamination strip within the scope of the invention so as to meet at least some of the objects thereof. Whether stack 83 contains individual laminations or is helically wound, it is also contemplated that the laminae of the stack may be retained against displacement by suitable means well known to the art, such as for instance welding or cleating or the like, or that the stack may be of the loose laminae type well known in the art within the scope of the invention so as to meet at least some of the objects thereof.

Figure 8:
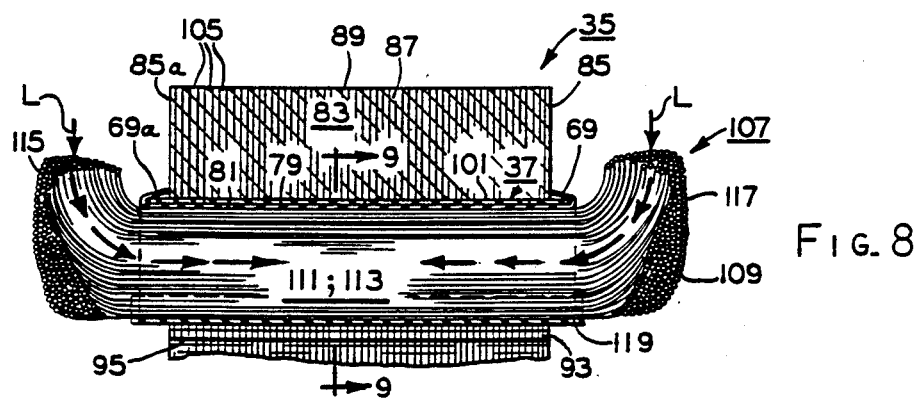
FIG. 8 is generally the same as FIG. 7 but additionally showing winding means associated with the core.
Figure 9:
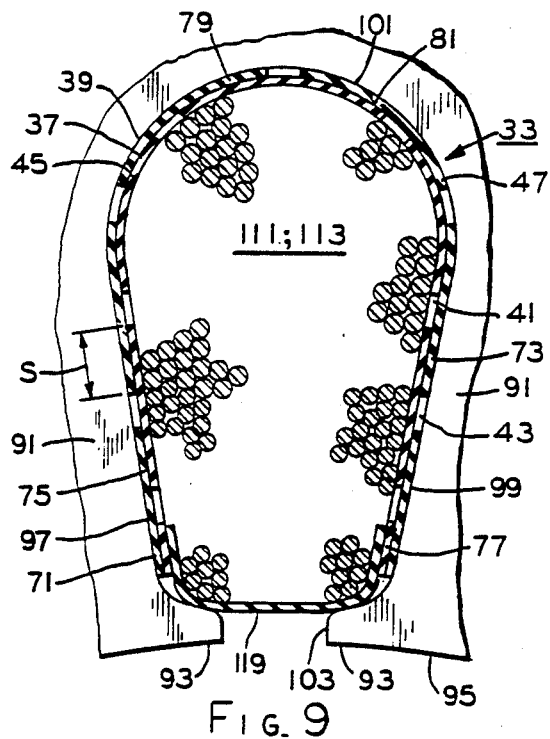
FIG. 9 is an enlarged sectional view taken along line 9—9 in FIG. 8.

Upon the assembling of slot liner 31 with stack 83 in another method in one form of the invention, the slot liner may be generally aligned with slot 33 in the stack adjacent end face 85 thereof, as best seen in FIG. 6, and the slot liner may be passed generally end-for-end into and in part through the slot into its assembled position, as shown in FIGS. 7–9. When slot liner 31 attains its assembled position in slot 33, it may be noted that sheet 37 of the slot liner is interposed between the slot and sheet 39 of the slot liner, and opposite cuffs 69,69a on sheet 39 are associated at least in part about the intersections of the slot with opposite end faces 85,85a in resilient gripping engagement with the opposite end faces. Thus, opposite side portions 71,73 and end portion 79 on sheet 37 of slot liner 31 are respectively engaged or seated at least in part in confronting relation with opposed sidewalls 97,99 and end wall 101 of slot 33, and it may be further noted that apertures 41 in sheet 37 not only communicate with non-apertured sections 47 in sheet 39 but also with the opposed sidewalls and end wall of the slot. Furthermore it may also be noted that the preselected spacing S is maintained between wall means 65,67 of respective adjacent ones of apertures 41,43 in different adjacent sheets 37,39 of slot liner 31 when the slot liner is disposed in its assembled position with respect to slot 33 in stack 83, and apertures 43 in sheet 39 not only communicate with non-apertured sections 45 in sheet 37 but also with the part of the slot defined within sheet 39. While the foregoing describes the placement or injection of only one slot liner 31 in one slot 33 of stack 83, it is contemplated that groups of the slot liners, or perhaps all of the slot liners, may be simultaneously inserted into the slots by the aforementioned shaping and injection apparatus (not shown) within the scope of the invention so as to meet at least some of the objects thereof.

Figure 10:
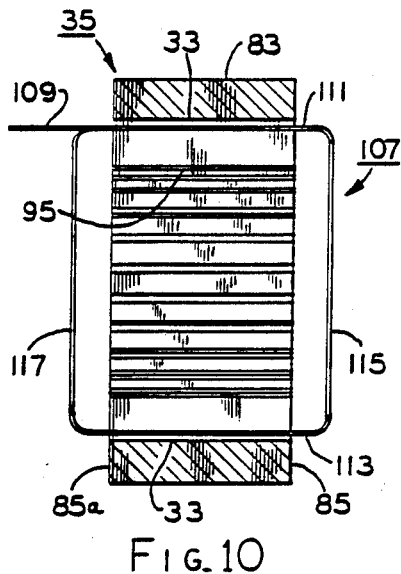
FIG. 10 is a schematic sectional view of the core of FIG. 6 illustrating the insertion of one coil of the winding means into slots provided therefor in the core.

When slot liners 31 are disposed in their assembled positions in slots 33 of stack 83, as discussed above, winding means 107 comprising a plurality of coils 109 of any suitably enameled, electrical conductive wire may be wound or otherwise placed or inserted into the slots, and it is contemplated that the winding means may be associated with the stack on any conventional coil winding and/or coil placement equipment (not shown) as is well known to the art. As may be best seen in FIGS. 8–10, upon the aforementioned association of winding means 107 with stack 83, a pair of opposite side turn portions 111,113 of coils 109 are received within sheets 39 of slot liners 31 arranged in their assembled positions within slots 33 of the stack thereby to electrically insulate the winding means from the stack, and a pair of opposite end turn portions 115,117 of the coils are arranged in generally annular groupings thereof about bore 95 of the stack so as to be spaced adjacent opposite end faces 85,85a of the stack, respectively. As illustrated schematically in FIG. 10, each coil 109 of winding means 107 includes at least one turn or loop of a conductor, such as the aforementioned enameled electrical conductive wire. Albeit not shown for purposes of drawing simplicity, it is contemplated that, if desired or if necessary, opposite end turn portions 115,117 of coils 109 may be shaped and/or pressed back into the aforementioned generally annular groupings thereof adjacent opposite end faces 85,85a of stack 83 by suitable conventional equipment (not shown) which is well known to the art. As previously mentioned, the preselected spaces S are maintained between apertures 41,43 in adjacent sheets 37,39 of slot liners 31 when the slot liners are in their assembly positions in slots 33, and such spacing S is provided to protect against voltage creepage between winding means 107 and the wall means of the slots.

Either generally simultaneously with the association of winding means 107 with stack 83 or subsequent thereto, a plurality of means, such as slot wedges 119 or the like for instance, may be placed or inserted at least in part within slots 33 so as to extend at least across openings 103 and between adjacent tooth tips 93 for maintaining opposite side turn portions 111,113 against displacement from the slots through the openings toward bore 95 of the stack, as best seen in FIGS. 8 and 9. While slot wedges 119 are shown herein as being arranged in part in overlaying relation with opposite side portions 75,77 on sheet 39 of slot liners 31 within slots 33, it is contemplated that the slot wedges may also be interposed in part between opposite side portions 71,73 on sheet 37 of the slot liner and opposed sidewalls 97,99 of the slots. Furthermore, albeit not shown, it is contemplated that a strip of phase insulating means may be provided in at least some of the slots 33 in stack 83, if necessary or if desired to electrically insulate coils 109 of different electrical phases. If a more complete discussion of the aforementioned phase insulating means is desired, reference may be had to U.S. Pat. No. 4,485,126. As illustrated herein for purposes of disclosure, slot wedges 119 may be formed of any suitable dielectric material, such as the aforementioned Mylar sheet material for instance; however, it is contemplated that other slot wedges having different configurations and formed of different materials, such as for example magnetic slot wedges or the like, may be utilized within the scope of the invention so as to meet at least some of the objects thereof.

Figure 11:
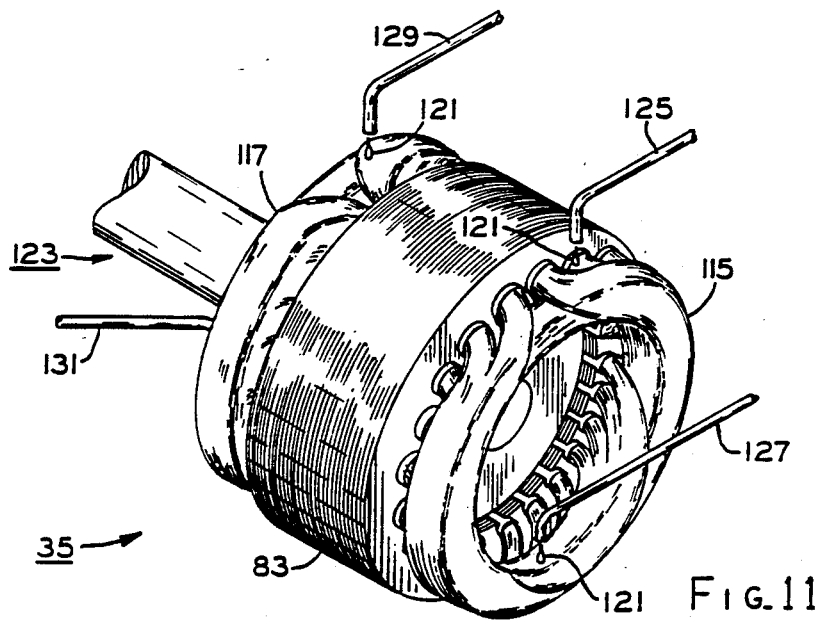
FIG. 11 is a perspective view of a core mounted to a rotatable mandrel at an operation station for dispensing a hardenable liquid adhesive material onto the winding means and illustrating principles which may be practiced in a method of treating a core.
Figure 12:
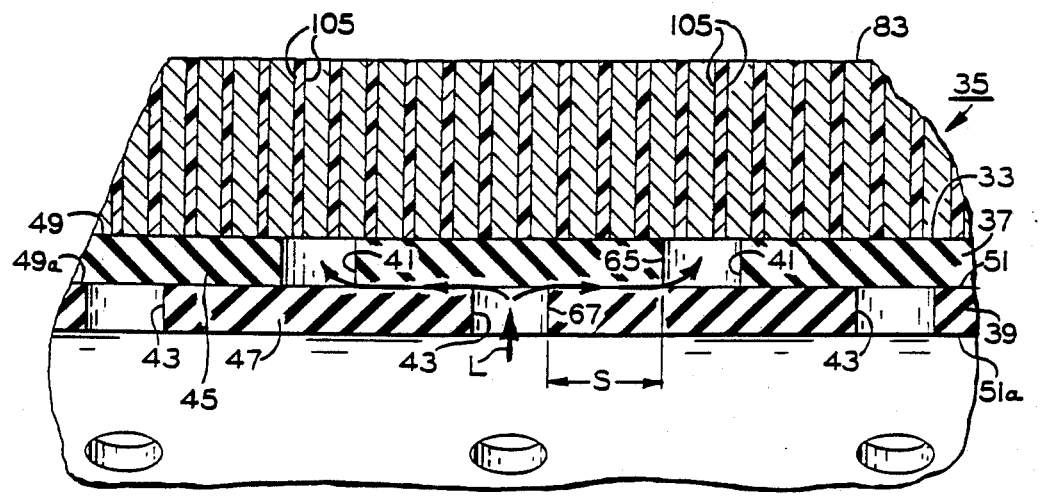
FIG. 12 is an enlarged sectional view taken along line 12—12 of FIG. 9 with the winding means removed for clarity and illustrating the flow of the hardenable liquid adhesive material through the slot liner so as to wet by capillary action interfacing lamination surfaces in a lamination stack of the core.

Subsequent to the association of winding means 107 with stack 83, core 35 may be treated with a hardenable liquid adhesive material 121 by a method in one form of the invention, as best seen in FIGS. 8, 11 and 12. For purposes of disclosure, liquid adhesive material 121 may be a formula I-800 water based varnish with a solid content in a range of between generally about 9% and about 38%, and such liquid adhesive material is available from Schenectady Chemicals, Inc., Schenectady, NY; however, it is contemplated that various other liquid adhesive materials, such as for instance solvent or water based varnishes, solventless resins or the like having either the same or different solid contents than mentioned above, may be utilized within the scope of the invention so as to meet at least some of the objects thereof.

In the practice of this core treating method, bore 95 in stack 83 of core 35 may be received or mounted for conjoint rotation on a rotatable mandrel 123 which is adapted to be rotated in preselected sequences both clockwise and counterclockwise, as indicated by the opposite rotational arrows in FIG. 11. Hardenable liquid adhesive material 121 may be dispensed at a preselected rate of flow from a plurality of protractive and retractive nozzles 125,127 and 129,131 onto opposite end turn portions 115,117 of winding means 107 during the conjoint rotation of the core and mandrel, respectively. When so applied onto opposite end turn portions 115,117 of winding means 107, some liquid adhesive material 121 is retained in the interstices between the opposite end turn portions of coils 109, and the liquid adhesive material also flows from the opposite end turn portions of the coils along opposite side turn portions 111,113 of the coils into slots 33 in stack 83 within slot liners 31 and slot wedges 119 disposed generally in surrounding relation about the opposite side turn portions of the coils received in the slots, as indicated by the liquid adhesive material flow arrows L in FIG. 8. If a more detailed explanation concerning the construction and operation of apparatus for dispensing the liquid adhesive material onto the core, the flow of the liquid adhesive material along the opposite side and end turn portions of the coils into the slots, and various alignment and/or mounting apparatus which may be associated with stack 83 to insure axial alignment of slots 33, teeth 91 and bore 85 when the core is associated with rotatable mandrel 123, reference may be had to the aforementioned U.S. Pat. No. 4,559,698.

While some of the liquid adhesive material 121 introduced into slots 33 of stack 83 within slot liners 31 disposed in the slots is retained in the interstices of opposite side turn portions 111,113 of coils 109 and also between the opposite side turn portions and sheets 39 of the slot liners in the slots, it may be noted that the liquid adhesive material is caused to flow through at least some of apertures 43 in sheets 39, as indicated by the liquid adhesive material flow arrows L in FIG. 12. From apertures 43 in sheets 39 of slot liners 31, liquid adhesive material 121 is flowed or channeled by capillary action between at least some of the overlaying non-apertured sections 45,47 in sheets 37,39 of the slot liners into at least some of apertures 41 in sheets 37 which communicate directly with opposed sidewalls 97,99 and end walls 101 of slots 33; therefore, it may also be noted that the liquid adhesive material is flowed from apertures 41 in sheets 37 by capillary action directly into communication between sheets 37 and the wall means of the slots in stack 83, respectively. As previously mentioned, opposed sidewalls 97,99 and end walls 101 of slots 33 in stack 83 are intersected by interfacing lamination surfaces 105 of the stack, and it may be further noted that some of the liquid adhesive material 121 communicating between sheets 37 of slot liners 31 and the wall means of slots 33 in stack 83 is effective to wet by capillary action at least a part of at least some of the interfacing lamination surfaces, as best seen in FIG. 12.

It is believed that the positive and directed flow of liquid adhesive material 121 through apertures 41,43 in sheets 37,39 of slot liners 31 into slots 33 of stack 83, as discussed above, effects a more uniform wetting of interfacing lamination surfaces 105 in the stack which is believed to result not only in a greater bond strength for core 35 upon the curing of the liquid adhesive material but also in a more uniform bond strength from core to core utilizing the core treatment method of this invention. As previously mentioned, apertures 41,43 may be concentrated or predeterminately spaced in their preselected patterns in sheets 37,39 of slot liners 31 in order to predetermine the delivery of liquid adhesive material to desired parts of opposed sidewalls 97,99 and end walls 101 of slots 33 in stack 83. In this manner, it may be noted that liquid adhesive material 121 may be predeterminately directed to wet interfacing lamination surfaces 105 intersecting with the opposed sidewalls 97,99 and end walls 101 at the aforementioned desired parts thereof in order to enhance the bond strength of core 35 upon the curing of the liquid adhesive material. It is also believed that the aforementioned positive, yet controlled, flow of liquid adhesive material 121 directed through apertures 41,43 in sheets 37,39 of slot liners 31, as discussed above, may be effected at a rate great enough to obviate undesirable passage of the liquid adhesive material from the slot liners onto opposite end faces 85,85a of stack 83 which, of course, would necessitate an additional operation and expense to clean or wipe the overflowed liquid adhesive material from the opposite end faces of the stack. It is also believed that circumferential surface 89 of stack 83 is free of any liquid adhesive material 121 which wets by capillary action between interfacing lamination surfaces 105 which intersect with the circumferential surface thereby to obviate an undesirable operation and expense of cleaning or wiping liquid adhesive material from the circumferential surface of the stack. To complete the description of the above discussed core treatment method as well as core 35, liquid adhesive material 121 may be cured or hardened by subjecting the core to heat and then cooling the core in any suitable manner well known to the art.

In FIGS. 13-18, an alternative slot liner or slot liner assembly 141 in one form of the invention and an alternative method of assembling slot liner 141 are illustrated, and the alternative slot liner and its assembling method have generally the same structural and method features as the previously discussed slot liner 31 and its assembling method with the exceptions noted below. Further, while alternative slot liner 141 meets at least some of the objects of the invention set out hereinabove, it is believed that such alternative slot liner may have indigenous objects and advantageous features as will be in part apparent and in part pointed out hereinafter.

Figure 13:
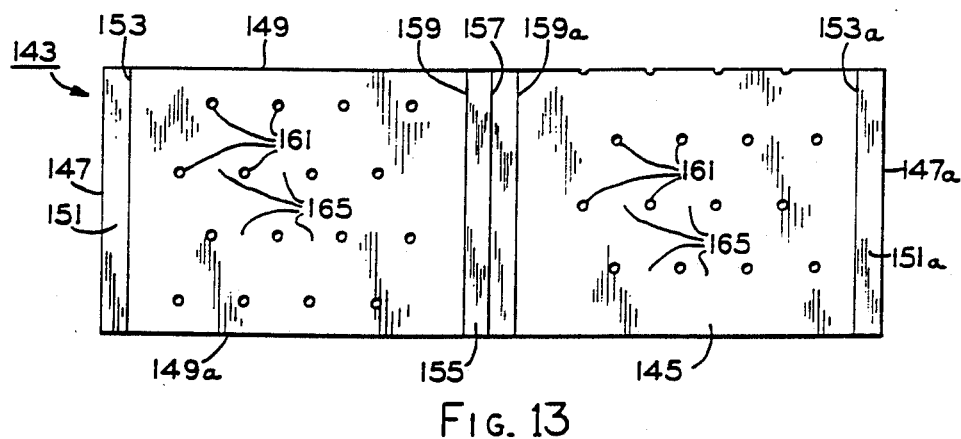
FIG. 13 is a plan view showing a sheet of generally thin dielectric material having a plurality of apertures extending therethrough in a preselected pattern with the sheet being utilized in an alternative slot liner in one form of the invention and an alternative method of assembling a slot liner, respectively.
Figure 14:
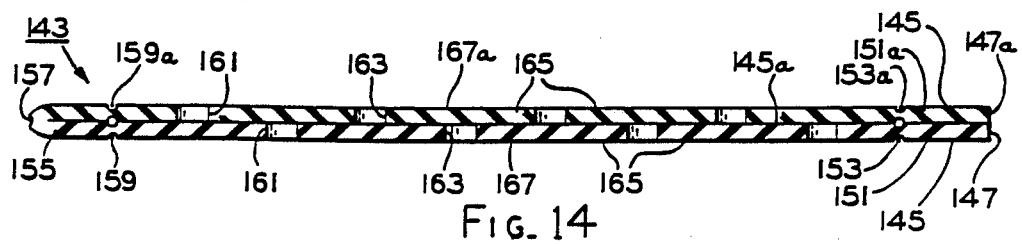
FIG. 14 is an enlarged end view showing the sheet of FIG. 13 folded upon itself.
Figure 15:
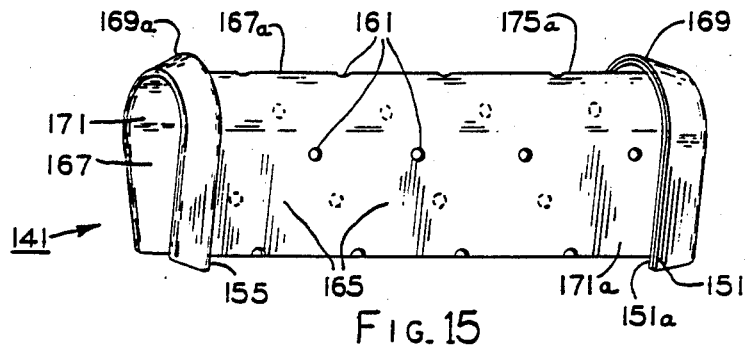
FIG. 15 is a perspective view of the alternative slot liner formed from the sheet of FIG. 13.

As best seen in FIGS. 13-15, slot liner 141 comprises a sheet 143 of generally thin dielectric material, such as for instance the aforementioned Mylar sheet material or the like. Sheet 143 has a pair of opposite surfaces 145,145a, and the opposite surfaces are interconnected by a pair of sets of opposite marginal edges 147,147a and 149,149a with adjacent ones of the opposite marginal edges intersecting each other, respectively. As further discussed hereinafter, sheet 143 is provided with a pair of imperforate parts or strips 151,151a extending along opposite marginal edges 147,147a and between opposite surfaces 145,145a, and if desired, such imperforate strips may be delineated by fold lines 153,153a impressed in the strip. Another generally central imperforate part or strip 155 is provided in sheet 143 intermediate imperforate strips 151,151a and extending generally parallel therewith between opposite surfaces 145,145a of the sheet. If desired, a plurality of generally central and spaced apart fold lines 157,159,159a may be impressed in sheet 143 in central imperforate strip 155 so as to extend between opposite marginal edges 149,149a and generally parallel with fold lines 153,153a. Albeit not shown for purposes of drawing simplification and brevity of disclosure, it is contemplated that additional fold lines may be provided in sheet 143 within the scope of the invention so as to meet at least some of the objects thereof.

A plurality of apertures 161 are arranged in a preselected pattern in sheet 143, and each aperture has wall means, such as a marginal wall or a sidewall 163 or the like for instance, defining its configuration with opposite ends or end portions of the wall means intersecting with opposite surfaces 145,145a of the sheet, respectively. Sheet 143 also has a plurality of non-apertured sections 165 which interconnect between apertures 161, respectively.

In practicing the aforementioned alternative assembling method, sheet 143 is folded generally in half along central fold line 157 into a pair of overlaying layers 167,167a of the sheet, as best seen in FIGS. 14 and 15. Thus, opposite surface 145a of sheet 143 is folded upon itself to align opposite marginal edges 149,149a in overlaying layers 167,167a, respectively, and opposite marginal edges 147,147a are aligned adjacent each other in the overlaying layers. In response to the folding of sheet 143, imperforate strips 151,151a are disposed in overlaying relation in overlaying layers 167,167a, and central imperforate strip 155 is folded into overlaying relation upon itself in the overlaying layers, respectively; therefore, fold lines 153,153a and 159,159a are generally aligned in overlaying relation in the overlaying layers, respectively. Further, apertures 161 in each overlaying layer 167,167a are arranged in non-aligning or staggered relation with each other, and opposite surface 145a on sheet 143 at non-apertured sections 165 is engaged about one opposite end of aperture wall means 163, respectively. Thus, apertures 161 in each layer 167,167a are communicated with non-apertured sections 165 in an adjacent layer. As previously discussed, preselected space S is provided between wall means 163 of adjacent apertures 161 in different adjacent layers 167,167a, respectively.

Figure 16:
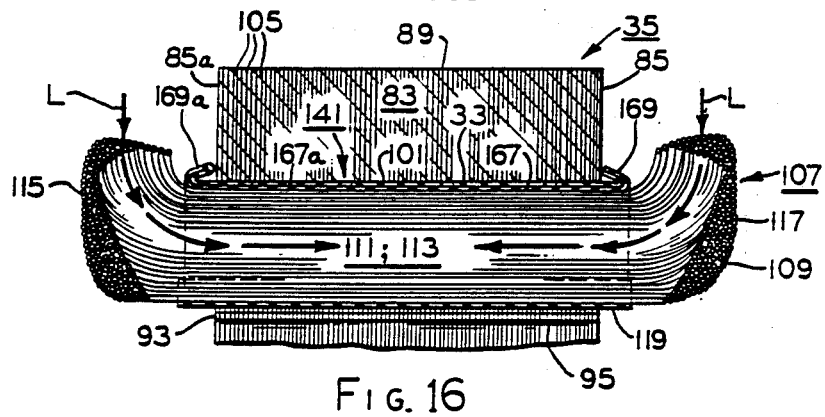
FIG. 16 is a sectional view showing the alternative slot liner of FIG. 15 in its assembled position in a slot of the lamination stack of FIG. 6.

Upon the above discussed folding of sheet 143 and the establishment of preselected space S between apertures 161 in adjacent layers 167,167a, adjacent overlaid imperforate strips 151,151a and the overlaid central strip 155 may be further folded or deformed generally along the aligned fold lines 153,153a and 159,159a, respectively, thereby to form a pair of generally opposite cuffs 169,169a on the layers, and the opposite cuffs are angularly positioned in spaced overlaying relation with layer 167, as best seen in FIGS. 14-16.

Subsequent to the formation of opposite cuffs 169,169a on layers 167,167a, the layers and opposite cuffs may be conjointly deformed or shaped into a preselected configuration at least approximating the configuration of slot 33 in stack 83 thereby to define slot liner 141, as best seen in FIG. 16. When so shaped, layers 167,167a are deformed into a generally U-shaped or horseshoe shaped configuration, and the aforementioned opposite marginal edges 149,149a respectively aligned in overlaying relation in layers 167,167a are positioned generally in laterally spaced relation with each other. Thus, layers 167,167a in the U-shaped configuration thereof define a pair of generally opposite sides or side portions 171,171a and 173,173a with end or end portions 175,175a integrally interconnected therebetween, respectively. Of course, opposite side portions 171,171a and 173,173a and end portions 175,175a extend between opposite cuffs 169,169a of layers 167,167a. To complete the description of slot liner 141 and its assembling method, it may be noted that the preselected space S between wall means 163 of adjacent apertures 161 in different layers 167,167a are maintained when the layers are deformed into the generally U-shaped configuration thereof.

Figure 17:
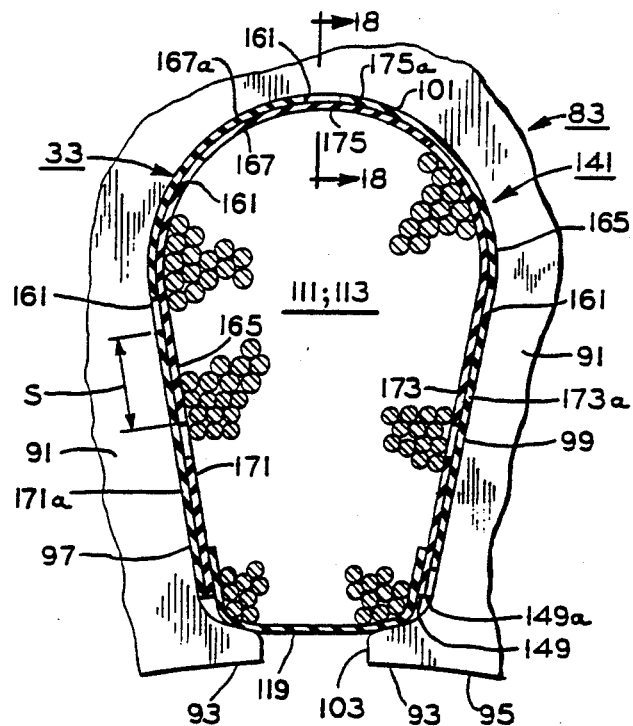
FIG. 17 is an enlarged sectional view taken along line 17—17 in FIG. 16.
Figure 18:
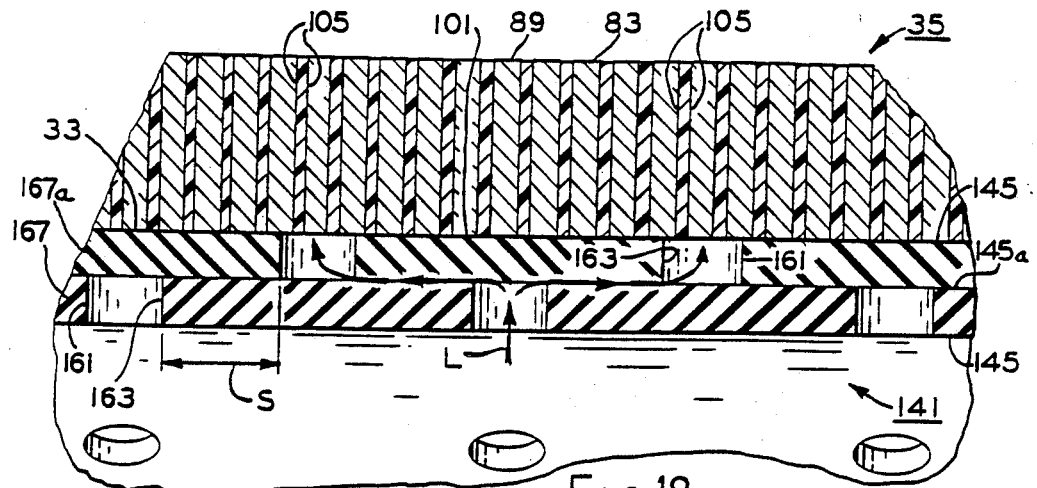
FIG. 18 is an enlarged sectional view taken along line 18—18 in FIG. 17 and illustrating the flow of hardenable liquid adhesive material through the alternative slot liner to wet by capillary action the interfacing lamination surfaces of the stack.

Of course, slot liner 141 may be placed or inserted into slot 33 of stack 83 in the same manner as previously discussed with respect to slot liner 31. When so associated with slot 33 of stack 83, opposite cuffs 169,169a are arranged in resilient gripping engagement with opposite end faces 85,85a of the stack, and opposite side portions 171a,173a and end portion 175a in layer 167a are at least in part engaged or seated in confronting relation with opposed sidewalls 97,99 and end wall 101 of slot 33 in the stack, respectively, as best seen in FIG. 17. In this manner, apertures 161 in layer 167a communicate with both the wall means of slot 33 in stack 83 and non-apertured sections 165 in layer 167, and layer 167 and slot wedges 119 are disposed generally in surrounding relation about opposite side turn portions 111,113 in coils 109 of winding means 107 received in the slots of the stack. Thus, when liquid adhesive material 121 is applied onto winding means 107 so as to be introduced into slots 33 of stack 83, as previously discussed, the liquid adhesive material flows through apertures 161 in layer 167, then by capillary action between non-apertured sections 165 in layers 167,167a, thereafter through apertures 161 in layer 167a, and by capillary action between layer 167a and the wall means of the slots to effect the wetting of interfacing lamination surfaces 105 intersecting with the wall means of the slot, as best seen in FIG. 18.

In FIGS. 19-24, another alternative slot liner or slot liner assembly 191 in one form of the invention and another alternative method of asembling slot liner 191 are illustrated, and the alternative slot liner and its assembling method have generally the same structural and method features as the previously discussed slot liner 31 and its assembling method with the exceptions noted below. Further, while alternative slot liner 191 meets at least some of the objects of the invention set out hereinabove, it is believed that such alternative slot liner may have indigenous objects and advantageous features as will be in part apparent and in part pointed out hereinafter.

Figure 19:
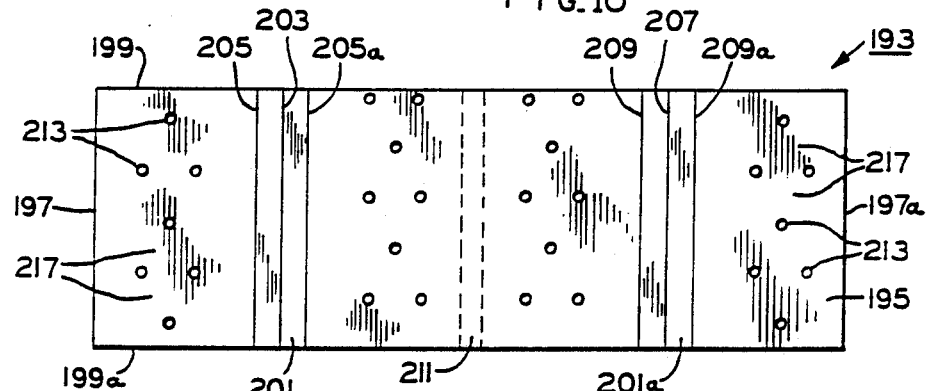
FIG. 19 is a plan view showing a sheet of generally thin dielectric material having a plurality of apertures extending therethrough in a preselected pattern with the sheet being utilized in another alternative slot liner in one form of the invention and another alternative method of assembling a slot liner, respectively.
Figure 20:
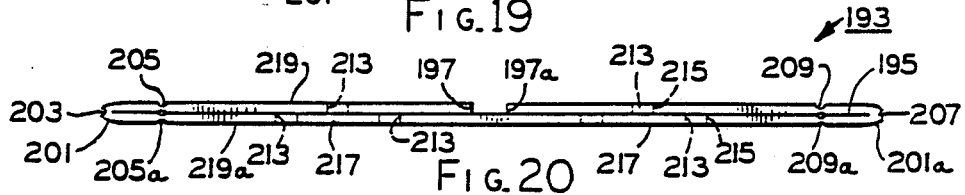
FIG. 20 is an enlarged end view showing the sheet of FIG. 19 folded upon itself.
Figure 21:
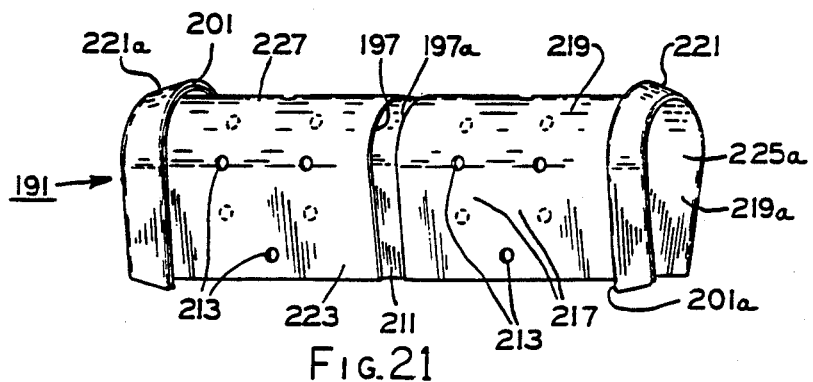
FIG. 21 is a perspective view of the alternative slot liner formed from the sheet of FIG. 19.

As best seen in FIGS. 19-21, slot liner 191 comprises a sheet 193 of generally thin dielectric material, such as the aforementioned Mylar sheet material of the like for instance. Sheet 193 has a pair of generally opposite surfaces 195,195a, and the opposite surfaces are interconnected by a pair of sets of opposite marginal edges 197,197a and 199,199a with the adjacent ones of the opposite marginal edges intersecting each other, respectively. As further discussed hereinafter, sheet 193 is provided with a pair of imperforate parts or strips 201, 201a laterally spaced from opposite marginal edges 197,197a and extending generally in parallel relation between opposite marginal edges 199,199a, and if desired, such imperforate strips may be delineated by fold lines 203,205,205a and 207,209,209a impressed in the sheet, respectively. Another generally central imperforate part or strip 211, as indicated in dotted outline in FIG. 19, is provided in sheet 193 extending generally in parallel relation with imperforate strips 201,201a between opposite marginal edges 199,199a. Albeit not shown for purposes of drawing simplification and brevity of disclosure, it is contemplated that additional fold lines may be provided in sheet 193 within the scope of the invention so as to meet at least some of the objects thereof.

A plurality of apertures 213 are arranged in a preselected pattern in sheet 193, and each aperture has wall means, such as a marginal wall or a sidewall 215 or the like for instance, defining its configuration with opposite ends or end portions of the wall means intersecting with opposite surfaces 195,195a of sheet 193, respectively. Sheet 193 also has a plurality of non-apertured sections 217 which interconnect between apertures 213.

In practicing the aforementioned assembling method, sheet 193 is folded upon itself generally along fold lines 203,207 in imperforate strips 201,201a into a pair of overlaying layers 219,219a of the sheet, as best seen in FIGS. 20 and 21. In response to the folding of sheet 193, imperforate strips 201,201a are folded upon themselves generally at fold lines 203,207 so as to extend in both layers 219,219a, and opposite marginal edges 197,197a are arranged generally in opposed relation at least adjacent each other in layer 219 and in overlaying relation with central imperforate strip 211 in layer 219a, respectively. Further, fold lines 205,205a are generally aligned in overlaying relation with each other in layers 219,219a, as are fold lines 209,209a, respectively. It may be noted that apertures 213 in each overlaying layer 219,219a are arranged in non-aligning or staggered relation with each other, and opposite surface 195 on sheet 193 at non-apertured sections 217 is engaged about one opposite end of aperture wall means 215, respectively. Thus, apertures 213 in each layer 219,219a are communicated with non-apertured sections 217 in an adjacent layer. As previously mentioned, preselected space S is provided between wall means 215 of adjacent apertures 213 in different adjacent layers 219,219a, respectively.

Figure 22:
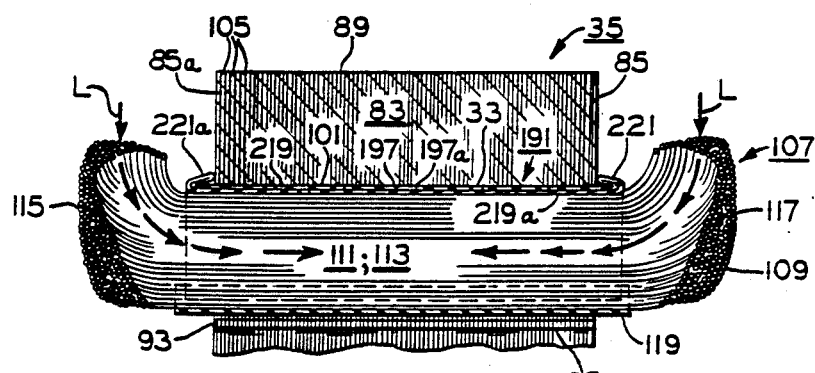
FIG. 22 is a sectional view showing the alternative slot liner of FIG. 21 in its assembled position in a slot of the lamination stack of FIG. 6.
Figure 23:
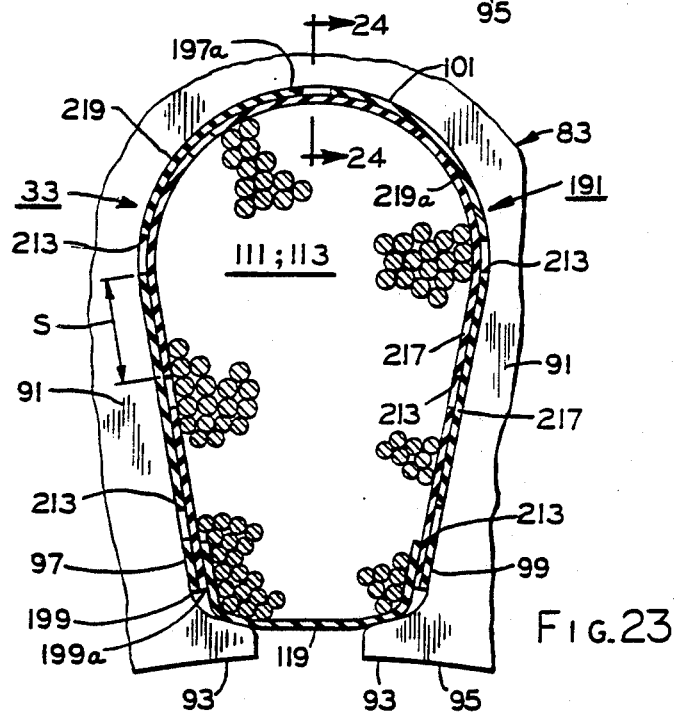
FIG. 23 is an enlarged sectional view taken along line 23—23 in FIG. 22.

Upon the above discussed folding of sheet 193 and the establishment of preselected space S between apertures 213, layers 219,219a may be further folded or deformed at overlaying aligned fold lines 205,205a and 209,209a in the layers thereby to form the overlaid imperforate strips 201,201a into a pair of generally opposite cuffs 221,221a, and the opposite cuffs are generally angularly positioned in spaced overlaying relation with layer 219, respectively, as best seen in FIGS. 20-22.

Subsequent to the formation of opposite cuffs 221,221a on layers 219,219a, the layers and cuffs may be conjointly deformed or shaped into a preselected configuration at least approximating the configuration of slot 33 in stack 83 thereby to define or form slot liner 191, as best seen in FIG. 22. When so shaped, layers 219,219a are deformed into a generaly U-shaped or horseshoe shaped configuration, and the aforementioned opposite marginal edges 199,199a respectively aligned in overlaying relations in layers 219,219a are positioned generally in laterally spaced apart relation with each other. Thus, layers 219,219a in the U-shaped configuration thereof define a pair of generally opposite sides or side portions 223,223a and 225,225a with end or end portions 227,227a integrally interconnected therebetween in layers 219,219a, respectively. Of course, opposite side portions 223,223a and 225,225a and end portions 227,227a extend between opposite cuffs 221,221a on layers 219,219a. To complete the description of slot liner 191 and its assembling method, it may be noted that preselected space S between wall means 215 of adjacent apertures 213 in different adjacent layers 219,219a are maintained when the layers are deformed into the generally U-shaped configuration thereof.

Figure 24:
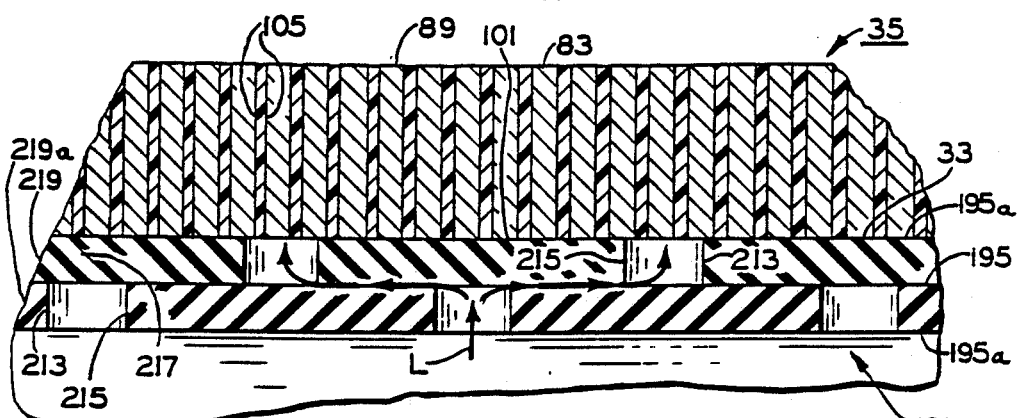
FIG. 24 is an enlarged sectional view taken along line 24—24 in FIG. 23 and illustrating the flow of hardenable liquid adhesive material through the alternative slot liner to wet by capillary action the interfacing lamination surfaces of the stack.

Slot liners 191 may be placed or inserted into slots 33 of stack 83 in the same manner as previously discussed with respect to slot liner 31. When slot liners 191 are so associated with slots 33, opposite cuffs 221,221a are arranged in resilient gripping engagement with opposite end faces 85,85a of stack 83, and opposite side portions 223,223a and end portion 227 in layer 219 are at least in part engaged or seated in confronting relation with opposed sidewalls 97,99 and end wall 101 of slot 33 in the stack, as best seen in FIG. 22. In this manner, apertures 213 in layer 219 communicate with both the wall means of slots 33 in stack 83 and non-apertured sections 217 in layer 219a, and layer 219a and slot wedge 199 are overlapped so as to be disposed generally in surrounding relation about opposite side turns portions 111,113 of coils 109 received in the slots of the stack, respectively. Thus, when liquid adhesive material 121 is applied onto winding means 107 so as to be introduced into slots 33 of stack 83, as previously discussed, the liquid adhesive material flows through apertures 213 in layer 219a, then by capillary action between the non-apertured sections 217 in layers 219,219a, thereafter through apertures 213 in layer 219, and by capillary action between the wall means of the slots to effect the wetting of interfacing lamination surfaces 105 intersecting with the wall means of the slots, as best seen in FIG. 24.

Although cuffs 169,169a of slot liner 141 and cuffs 221,221a of slot liner 191 are illustrated herein as being imperforate for purposes of disclosure, it is contemplated that apertures 161,213 may be provided in cuffs 169,169a and 221,221a with the provision that the preselected spaces S are maintained between the apertures in the different adjacent layers of the cuffs, respectively, within the scope of the invention so as to meet at least some of the objects thereof.

From the foregoing, it is apparent that novel slot liners 31,141,191 and, a novel core 35 have been presented meeting the objects set out hereinbefore, as well as others, and it is contemplated that changes as to the precise arrangement, details and connections of the components utilized in such slot liners and core may be made by those having ordinary skill in the art without departing from the spirit of the invention or the scope of the claims which follow.

What we claim as new and desire to obtain by U.S. Letters Patent is:

1. A core for a dynamoelectric machine comprising:
a pair of generally opposite end faces on the core;
a circumferential yoke between said opposite end faces;

at least a pair of adjacent teeth extending on preselected pitch axes from said yoke and between said opposite end faces, respectively, and each adjacent tooth including a tip end spaced from said yoke;

at least one winding receiving slot in the core disposed between said yoke and said adjacent teeth and intersecting with said opposite end faces, said at least one slot including a pair of generally opposed sidewalls on said adjacent teeth, an end wall on said yoke interposed between said opposed sidewalls, and an opening extending between said tip ends of said adjacent teeth and said opposite end faces and arranged generally opposite said end wall;

a first sheet of generally thin dielectric material disposed at least in part within said at least one slot and including a pair of first opposite side portions disposed in confronting relation at least adjacent said opposed sidewalls, a first end portion interposed between said first opposite side portions and disposed in confronting relation at least adjacent said end wall, a plurality of first apertures in said first end and opposite side portions, said first apertures having a pair of opposite ends with at least some of one of said first opposite ends being disposed at least adjacent said end wall and opposite sidewalls, and a plurality of first non-apertured sections in said first end and opposite side portions and interconnected between said first apertures, respectively;

a second sheet of generally thin dielectric material disposed at least in part within said at least one slot in overlaying relation with said first sheet, said second sheet including a pair of second opposite side portions disposed in confronting relation at least adjacent said first opposite side portions, a second end portion interposed between said second opposite side portions and disposed in confronting relation at least adjacent said first end portion, a plurality of second apertures in said second end and opposite side portions and arranged in non-aligned relation with said first apertures, said second apertures having a pair of second opposite ends with at least some of one of said second opposite ends being disposed in overlaying relation at least adjacent at least some of said first non-apertured sections, a plurality of second non-apertured sections in said second end and opposite side portions and interconnected between said second apertures, at least some of said second non-apertured sections being disposed in overlaying relation at least adjacent at least some of the other of said first opposite ends, and a pair of generally opposite cuffs on said second end and opposite side portions and disposed at least adjacent said opposite end faces generally at the intersections of said at least one slot with said opposite end faces, respectively.

2. A core for a dynamoelectric machine comprising:
a generally axial stack of ferromagnetic material including a pair of generally opposite end faces, and wall means in said stack for defining at least one winding receiving slot intersecting with said opposite end faces, respectively;

a first sheet of generally thin dielectric material disposed at least in part within said at least one winding receiving slot in confronting relation at least adjacent said wall means, said first sheet including a plurality of first apertures arranged in a preselected pattern in said first sheet, and a plurality of first non-apertured sections connecting between said first apertures, respectively; and a second sheet of generally thin dielectric material disposed at least in part in overlaying relation with said first sheet and at least in part within said at least one winding receiving slot, said second sheet including a plurality of second apertures arranged in a preselected pattern in said second sheet and predeterminately misaligned with said first apertures, at least some of said second apertures being communicated with at least some of said first non-apertured sections, and a plurality of second non-apertured sections connected between said second apertures, at least some of said first apertures being communicated with both said wall means and at least some of said second non-apertured sections, respectively.

3. The core as set forth in claim 2 wherein said second sheet further includes a pair of generally opposite cuffs disposed in confronting relation at least adjacent said opposite end faces generally at the intersections of said at least one slot with said opposite end faces, respectively.

4. The core as set forth in claim 3 wherein said second sheet further includes at least one pair of generally opposite marginal edges, and a pair of imperforate strips in said second sheet adjacent said at least one pair of opposite marginal edges and defining said opposite cuffs, respectively.

5. The core as set forth in claim 3 wherein said first sheet further includes at least one pair of generally opposite marginal edges disposed at least adjacent said opposite cuffs, respectively.

6. The core as set forth in claim 2 wherein said first and second apertures each include a marginal wall defining the configuration thereof with each marginal wall in one of said first and second sheets being predeterminately spaced from others of said marginal walls in the other of said first and second sheets arranged adjacent said each marginal wall.

7. The core as set forth in claim 6 wherein the spacing between said each marginal wall and said other marginal walls is not less than about 0.094 inches (2.49 mm).

8. The core as set forth in claim 2 further comprising a winding including a plurality of coils, each coil having at least one conductor turn with a pair of generally opposite side turn portions interposed between a pair of generally opposite end turn portions, one of said opposite side turn portions of some of said coils extending through said at least one winding receiving slot adjacent said second sheet and the opposite end turn portions of said coils being arranged in generally annular groupsing thereof adjacent said opposite end faces of said strack, respectively.

9. The core as set forth in claim 8 further comprising a hardenable liquid adhesive material hardened in place in at least parts of said winding and said stack at least within said at least one winding receiving slot thereby to bond said stack, said windings and at least said first and second sheets into a generally unitary mass.

10. A core for a dynamoelectric machine comprising:
a pair of generally opposite end faces on the core;
wall means in the core for defining at least one winding receiving slot intersecting with said opposite end faces, respectively; and
a plurality of layers of generally thin dielectric material associated at least in part in overlaying relation and disposed at least in part within said at least one slot, each layer including a set of apertures arranged in a preselected pattern and with said apertures in adjacent layers being disposed in non-aligning relation, and a set of non-apertured sections between said apertures, at least some of said apertures in each layer being communicated with at least some of said non-apertured sections in an adjacent layer and said at least some apertures in one of said layers also being communicated with said wall means, respectively.

11. The core as set forth in claim 10 wherein each aperture includes a marginal wall defining its configuration with a spacing between adjacent marginal walls in different adjacent layers being at least about 0.094 inches (2.39 mm), respectively.

12. The core as set forth in claim 10 wherein another of said layers disposed in the overlaying relation with said one layer includes a pair of generally opposite cuffs arranged in confronting relation at least adjacent opposite end faces generally at the intersections of said at least one slot with said opposite end faces, respectively.

13. The core as set forth in claim 10 wherein said layers further include a pair of folded parts defining a pair of generally opposite cuffs disposed in confronting relation at least adjacent said opposite end faces generally at the intersections of said at least one slot with said opposite end faces, respectively.

14. The core as set forth in claim 13 wherein said one layer includes a pair of marginal edges arranged generally in opposed relation between said folded parts, and another of said layers adjacent said one layer including an imperforate strip arranged in overlaying relation across said marginal edges.

15. The core as set forth in claim 10 wherein said layers further include a folded part defining a cuff, a pair of adjacent marginal edges, another folded part generally adjacent said adjacent marginal edges and defining another cuff spaced generally opposite said first named cuff, and said first named and another cuffs being disposed in confronting relation at least adjacent said opposite end faces generally adjacent the intersections of said at least one slot with said opposite end faces, respectively.

16. The core as set forth in claim 10 further comprising winding means for association with the core, said winding means including a plurality of coils, each coil having at least one conductor turn defining a pair of generally opposite side turn portions interposed between a pair of generally opposite end turn portions, said opposite end turn portion being arranged in generally annular groupings thereof respectively adjacent said opposite end faces of said stack and said opposite side turn portions extending across said stack with one of said opposite side turn portions of some of said coils being disposed within said at least one slot adjacent another of said layers.

17. The core as set forth in claim 10 further comprising a winding means for association with the core, a hardenable liquid adhesive material hardened in place in at least parts of said winding means and the core thereby to bond said winding means, the core and said layers into a generally unitary mass.

18. The core as set forth in claim 17 further comprising a generally axial stack of ferromagnetic material having at least a generally annular yoke section, said at least one slot extending across said axial stack at least in part adjacent said yoke section, a plurality of interfacing surfaces defined by said ferromagnetic material within said axial stack and intersecting with at least said least one slot, said hardened hardenable liquid adhesive material being disposed in bonding relation between at least parts of at least some of said interfacing surfaces.

19. A slot liner for a winding receiving slot in a core for a dynamoelectric machine, the slot liner comprising:
a first sheet of generally thin dielectric material including a pair of firs generally opposite side portions, a first end portion interposed between said first opposite side portions, a plurality of first apertures arranged in a preselected pattern and extending through said first end and opposite sides portions, said first apertures having a plurality of first marginal walls defining the configuration of said first apertures, and a pair of generally opposite cuffs extending from at least a part of said first end and opposite side portion, respectively; and
a second sheet of generally thin dielectric material disposed in overlaying relation with said first sheet between said opposite cuffs, said second sheet including a pair of second generally opposite side portions disposed in confronting relation at least adjacent said first opposite side portions, a second end portion interposed between said second opposite side portions and disposed in confronting relation at least adjacent said first end portion, a plurality of second apertures arranged in a preselected pattern and extending through said second end and opposite side portions, said second apertures having a plurality of second marginal walls defining the configuration of said second apertures, said first and second apertures being disposed in non-aligning relation with each of said first and second marginal walls being spaced at least about 0.094 inches (2.39 mm) from each other, and a plurality of second non-apertured sections in said second end and opposite side portions, at least some of said second apertures being communicated with at least some of said first non-aperture sections and at least some of said first apertures being communicated with at least some of said second non-apertured sections, respectively.

20. A slot liner for a winding receiving slot in a core of a dynamoelectric machine, the slot liner comprising:
a first sheet of generally thin dielectric material including a plurality of first apertures arranged in a preselected pattern and extending through said first sheet, a plurality of first non-apertured sections interconnecting with said first apertures, and a pair of generally opposite cuffs on said first sheet, respectively;
a second sheet of generally thin dielectric material disposed at least in part in overlaying relation with said first sheet and extending generally between said opposite cuffs, said second sheet including a plurality of second apertures arranged in a preselected pattern and extending through said second sheet, said second apertures being arranged in non-aligned relation with said first apertures, and a plurality of second non-apertured sections interconnecting with said second apertures, at least some of said second apertures being communicated with at least some of said first non-apertured sections and at least some of said first apertures being communicated with at least some of said second non-apertured sections, respectively.

21. The slot liner as set forth in claim 20 wherein each first and second aperture includes a marginal wall defining its configuration, and each marginal wall of said first and second apertures being predeterminately spaced from each other, respectively.

22. The slot liner as set forth in claim 21 wherein the predetermined space between said marginal wall each of said first and second apertures is at least about 0.094 inches (2.39 mm).

23. A slot liner assembly for a winding receiving slot in a core of a dynamoelectric machine, the slot liner comprising:
a plurality of layers of generally thin dielectric material associated at least in part in overlaying relation, each layer including a plurality of apertures extending therethrough and arranged in a preselected pattern, and a pluarilty of non-apertured sections between said apertures, said apertures in adjacent layers being disposed in non-aligning relation and at least some of the apertures in each layer being disposed in communication with at least some of the non-apertured sections in an adjacent layer, respectively.

24. The slot liner as set forth in claim 23 wherein each aperture includes wall means for defining its configuration, and each wall means in each layer being spaced from adjacent wall means in said adjacent layers at least about 0.094 inches (2.39 mm).

25. The slot liner as set forth in claim 23 wherein one of said layers includes a pair of generally opposite cuffs and another of said layers extends between said opposite cuffs.

26. The slot liner as set forth in claim 23 wherein said layers includes a folded part defining a cuff, a pair of overlaid adjacent marginal edges, and another folded part adjacent said overlaid adjacent marginal edges.and defining another cuff generally opposite said first named cuff.

27. The slot liner assembly as set forth in claim 23 wherein said layers further include a pair of generally opposite folded parts defining a pair of generally opposite cuffs on said layers, respectively.

28. The slot liner assembly as set forth in claim 27 wherein one of said layers includes a pair of marginal edges arranged generally in opposed relation between said folded parts, and another of said layers includes an imperforate strip arranged in overlaying relation across said marginal edges.

* * * * *